United States Patent [19]

Talmage, Jr. et al.

[11] Patent Number: 4,777,328
[45] Date of Patent: Oct. 11, 1988

[54] CIRCULAR ELECTROGRAPHIC TOUCH SENSOR WITH ORTHOGONAL FIELDS AND LINEAR RESPONSE

[75] Inventors: John E. Talmage, Jr., Anderson County; John T. Quirk, Jr., Campbell County; William A. Gibson, Knox County, all of Tenn.

[73] Assignee: Elographics, Inc., Oak Ridge, Tenn.

[21] Appl. No.: 49,268

[22] Filed: May 13, 1987

[51] Int. Cl.[4] .............................................. G08C 21/00
[52] U.S. Cl. ...................................................... 178/18
[58] Field of Search ............... 178/18, 19, 20; 382/13, 382/59

[56] References Cited

U.S. PATENT DOCUMENTS

| | | | |
|---|---|---|---|
| 2,704,305 | 3/1955 | McLaughlin et al. | 178/18 |
| 2,891,244 | 6/1959 | Pastoriza | 343/7.3 |
| 3,632,874 | 1/1972 | Malavard et al. | 178/18 |
| 4,661,655 | 4/1987 | Gibson et al. | 178/18 |

Primary Examiner—Stafford D. Schreyer
Attorney, Agent, or Firm—Pitts and Brittian

[57] ABSTRACT

A circular touch sensor having very linear response in a two coordinate system. This circular sensor has four substantially identical and symmetrical quadrants, with points for the introduction of potentials being located at polar and equatorial points on the sensor. The sensor has a uniform electrical sheet resistivity, and each quadrant has a resistance element to distribute the potentials to electrodes connected thereto which are positioned along the perimeter of the circular resistive surface. Individual ends of the resistance element in each quadrant are connected to their respective "tie points" through a resistor of a size to adjust for a proper resistance value between the quadrants at these points. The size (effective length along the position path) of the electrodes in each quadrant generally increases, and the spacing between electrodes generally decreases, symmetrically from the edges of each quadrant toward the center of that quadrant. In this manner, voltage gradients are produced at each of the electrodes to compensate for any cumulative voltage drop along the resistance element due to current flow into the resistive surface and due to the circular geometric configuration. In the preferred embodiment, a "floating" conductive element is placed on the path of the electrodes proximate the tie points to further enhance linearity of the sensor near these points. A typical sensor of this type is described in detail.

20 Claims, 4 Drawing Sheets

CIRCULAR ELECTROGRAPHIC TOUCH SENSOR WITH ORTHOGONAL FIELDS AND LINEAR RESPONSE

TECHNICAL FIELD

The present invention relates to devices for inputting, or determining, the coordinates of a location in a two-coordinate system, and more particularly to a circular electrographic touch sensor with orthogonal electric fields having substantially linear response throughout the entire circular sensor.

BACKGROUND ART

There are many fields of technology where it is desirable to generate electrical signals that are proportional to some physical point in a two coordinate planar or non-planar system. Usually the two coordinates are at right angles to each other, i.e., are orthogonal. For example, it is often desirable to accurately reconstruct graphs or other technical data representation, to store such data in computers, etc. Often this application involves the use of a computer terminal screen where data displayed thereon is utilized, or new data is entered into the computer for other uses. A device that is commonly utilized for this interaction with the screen (or any video display) is an electrographic touch sensor. Contact of the sensor at any specific location with a finger or other object causes the generation of a signal that is representative of the X- and Y-coordinates of that particular point. In some applications of touch sensors there is no great demand upon linearity as the contact takes place in a general area to accomplish some action, such as a selection from a "menu". In other applications, however, the sensor must have substantially uniform linearity over essentially all of the sensor.

The general background of obtaining linearity in electrographic touch sensors is set forth in several patent applications having a common assignee with the present invention. In particular, U.S. Pat. No. 4,661,655, issued Apr. 28, 1987, and U.S. patent application Ser. No. 870,848, filed June 5, 1986, describe and claim the use of resistive electrodes along the edges of a rectangular touch sensor, with those electrodes having lengths and spacings selected to compensate for any voltage drop along resistance elements feeding voltages to those electrodes such that any bow in the equipotential lines within the sensor is substantially eliminated. This produces excellent linearity over substantially all of the sensor.

A majority of applications for a touch sensor involves a rectangular screen. However, in some applications a circular screen is utilized to display information. One such application is the screen of radar equipment. Although the screen is circular, the data displayed is often related to an X- and Y-coordinate system. There have been touch sensors that can be utilized on circular screens. One such sensor is described in U.S. Pat. No. 3,632,874, issued to L. C. Malavard on Jan. 4, 1972. Other such circular devices are described in U.S. Pat. Nos. 2,891,244, issued to J. J. Pastoriza, on June 16, 1959; and 2,704,305, issued to D. J. McLaughlin, et al., on Mar. 15, 1955. By referring to these patents, it can be seen that these involve complex components (and thus complex fabrication) or are, in the alternative, subject to regions of non-linearity around the periphery.

Accordingly, it is a principal object of the present invention to provide a circular electrographic touch sensor having substantial linearity throughout the entire sensor.

It is a further object of the present invention to provide a circular touch sensor having substantial linearity through the sensor as accomplished with a simple array of electrodes.

It is another object of the present invention to provide a touch sensor having a circular configuration that provides linear response by having orthogonal X- and Y-equipotential lines that are accurate within ±1 percent of a major diameter of the circular configuration.

It is also an object of the present invention to provide a circular touch sensor that can be fabricated without involving complex structures or complex fabrication steps.

These and other objects of the present invention will become apparent upon a consideration of the accompanying drawings and the detailed description thereof that follows.

SUMMARY OF THE INVENTION

In accordance with the present invention, there is provided a circular touch sensor which is effectively divided into four equal quadrants by establishing voltage introduction at polar points and equatorial points around the sensor. As in many other sensors, the surface thereof has a very uniform electrical sheet resistivity of, for example, 10 to 10,000 ohms per square. There is a resistance element curving along and proximate the edge of the resistive surface in each of the quadrants and this resistance element has, for example, a resistance of about 6 to 6,000 ohms per foot. A plurality of conductive electrodes are spaced along a circular path near the resistance element in each quadrant and these electrodes are individually attached to their respective resistance element. The effective size (length along the path) and the spacing of the electrodes in each quadrant are selected to produce a selected voltage gradient in the resistive surface at each electrode to compensate for the combined effects of any cumulative voltage drop along the resistance elements as current flows into the resistive surface and for the circular geometric configuration. Within each quadrant the electrodes generally increase in length, and the spacing therebetween decreases, symmetrically from each edge of the quadrant toward the center of the quadrant (i.e., the 45 degree line). Thus, each half of a quadrant is a mirror image of the other half. Opposite ends of each resistance element are used to input potentials to the resistive surface at the polar and equatorial points. However, the resistance value of this resistance element, in general, may be too low to join the closest electrodes of adjoining quadrants. Therefore, a resistor of appropriate value can be used to join each end of the resistance elements to the point of potential introduction. Further, in the preferred embodiment, a conductive element is placed proximate each of the potential introduction points (i.e., between each quadrant) along the circular path of the conductive electrodes to improve linearity of the sensor in these locations. These conductive elements do not receive any potential from external sources. The sensor of this invention can be planar or can be formed on a curved surface.

DETAILED DESCRIPTION OF THE INVENTION

Figure 6:
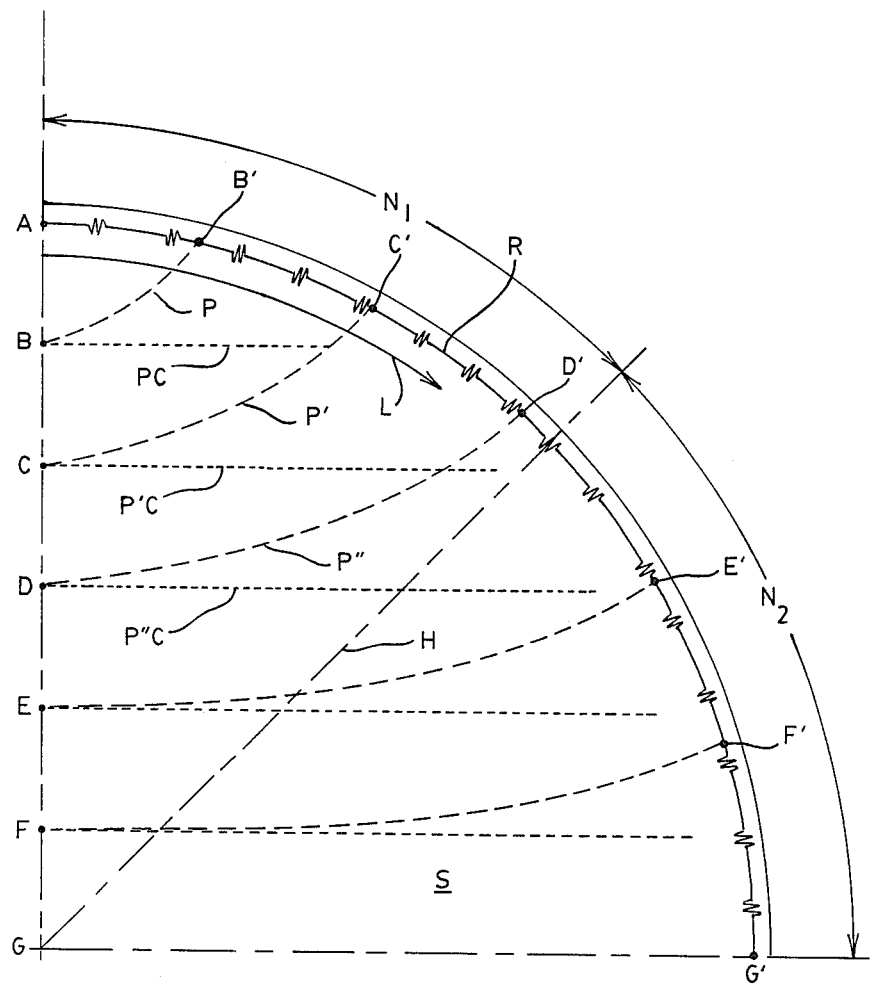
FIG. 6 is a drawing depicting one quadrant of a circular sensor, which drawing is useful for a description of the principle of the present invention.

In order to have a better understanding of the principle of the present invention, the drawing of FIG. 6 is presented. This depicts one quadrant of a circular sensor having a resistive surface, S. Due to the symmetries that will be discussed, a line, H, is shown as dividing the quadrant into two equal portions, $N_1$, $N_2$. Positioned along the outside edge (periphery) of the sensor is a resistance element, R, that is used to introduce potentials onto the surface through electrodes (not shown). For the purposes of discussion, it is assumed that the sensor is energized in the vertical (the Y) direction for the production of equipotential lines such that a voltage differential exists between point A and point G along a vertical radius of the sensor. (It will be understood that a further voltage differential of equal magnitude would exist along the rest of a vertical diameter of the sensor.) Indicated along this vertical radius are several points B-F intermediate points A and G, with the spacing between all of these points being equal to indicate that there will be an equal voltage differential between each of the points.

Indicated along the resistance element, R, are an equal number of points, i.e., B'-G'. These points are indicated as having the same potential as their counterparts along the vertical radius. Thus, point B' is joined to point B by an equipotential line P, point C' to point C with an equipotential line P', etc. The actual positions of these points B'-F' are influenced by two factors, one being geometrical and the other by current flow through the resistance element, as follow.

When a current flows in the resistance element, R, neglecting the current exiting into the active area of the sensor, the voltage drop along the resistance element is proportional to the distance, L, along the arc of the resistance element. This voltage drop is not linear in the Y direction as the Y-coordinate, $T_y$, of a point, T, on the resistance element is given by:

$$T_y = r \cos L/r,$$

where r is the radius of the circle. Thus, the points B', C', etc., do not fall at the same coordinates as B, C, etc., as indicated in FIG. 6. Furthermore, some current leaves the resistance element at each of the electrodes so that more current flows between points A and B' than between B' and C'. The current flow between points C' and D' is even less. Thus, the voltage gradient along the resistance element is greater nearer A and decreases toward G' causing the spacing between the indicated points to continuously increase along the resistance element. These differing voltage drops will also affect the configuration (curvature) of the equipotential lines, P, P', etc. Accordingly, it is these two controlling non-linearity introducing aspects of a circular sensor that require a compensation. Thus, as used hereinafter, the term "compensation" or "compensate" is used to define the adjustment of the equipotential lines so that they are straight and equally spaced throughout the sensor.

The present invention is further complicated by the fact that equipotential lines must also be produced in the X direction during alternate time periods. It is for that reason that each quadrant of the sensor must have a symmetry about the mid-point line, H. This is in contrast to rectangular sensors of the prior art (with current introduced at the corners) where the construction in the Y direction has little effect upon the construction in the X direction. Thus, when the circular sensor is energized to produce the aforementioned Y equipotential lines, the region designated $N_1$ is essentially a current source region where the size and distance between electrodes is important to adjust the potentials. The region designated $N_2$ is essentially a voltage dropping region and the size and separation distance are less unimportant, with the location being important to establish the correct potential. However, during the production of the equipotential lines in the X direction, these regions interchange their functions, illustrating the need for the symmetry about the line, H.

Referring to point B' in FIG. 6, in order to have its potential match that of point B, with the equipotential line therebetween being straight, as indicated at PC, additional voltage drops must be introduced at each electrode used to introduce the potential from resistance element, R, into the resistive surface, S. This additional voltage drop progressively decreases in a direction away from point A toward the mid-point line, H. It has been shown in the prior referenced patent application that the size (length) of the electrode affects this voltage drop at the electrode: the greatest voltage drop being at small electrodes. Thus, the electrode closest to point A would be smallest and each electrode farther along the path would generally increase in size. It was also shown in that patent application that the spacing between electrodes affects this voltage drop, with the greater voltage drop being at the greater spacing. The other equipotential linss in the sensor would then be straightened as indicated at PC, P"C, etc. Beyond the line, H, the sizes would then begin to decrease and the spacing increase, until the electrode closest to the point G' will again be small. In each of these half quadrants, as the size of the electrode increases, the spacing therebetween generally decreases to fully compensate for the non-linearity that would otherwise exist. In this manner, straight orthogonal X- and Y-equipotential lines are created in each quadrant and thus throughout all of the circular sensor.

Figure 1:
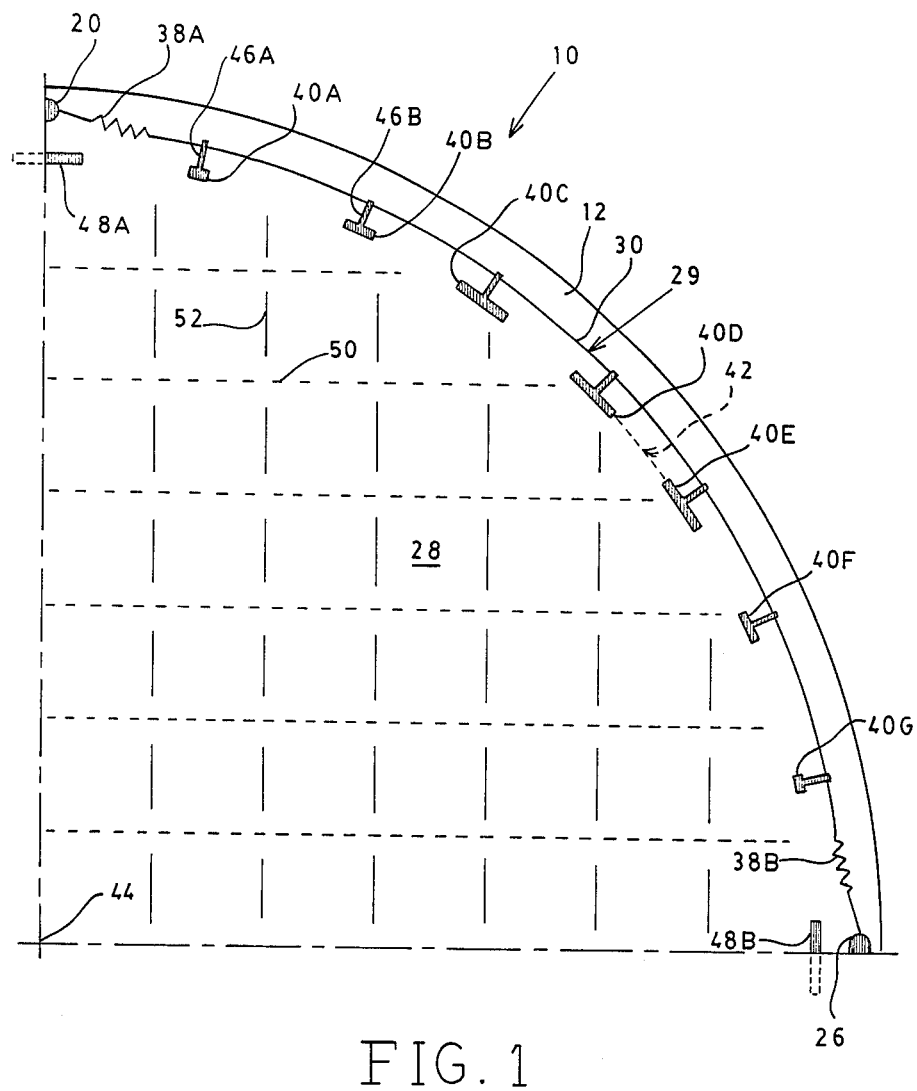
FIG. 1 is a drawing of one quadrant of one embodiment of the present invention.
Figure 3:
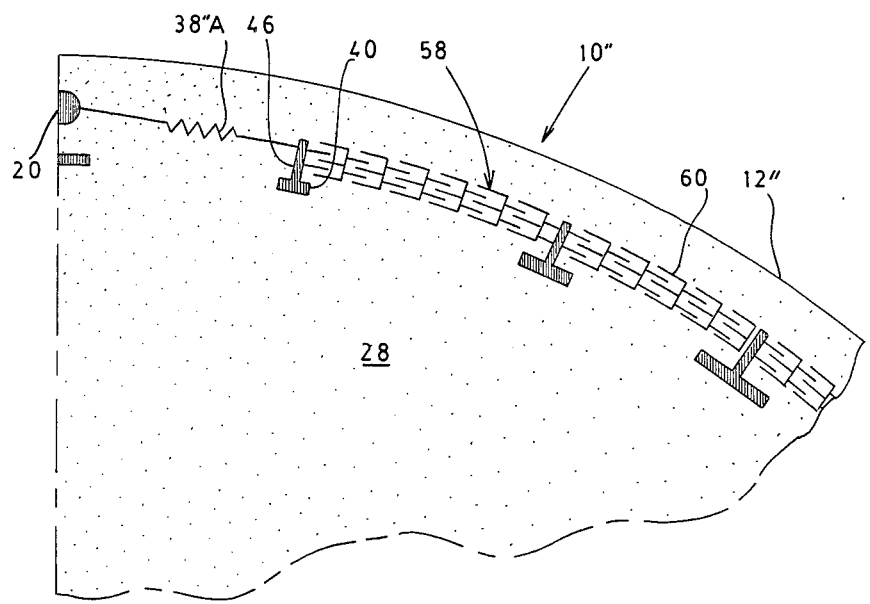
FIG. 3 is a drawing of a partial quadrant of still another embodiment of the present invention.
Figure 4:
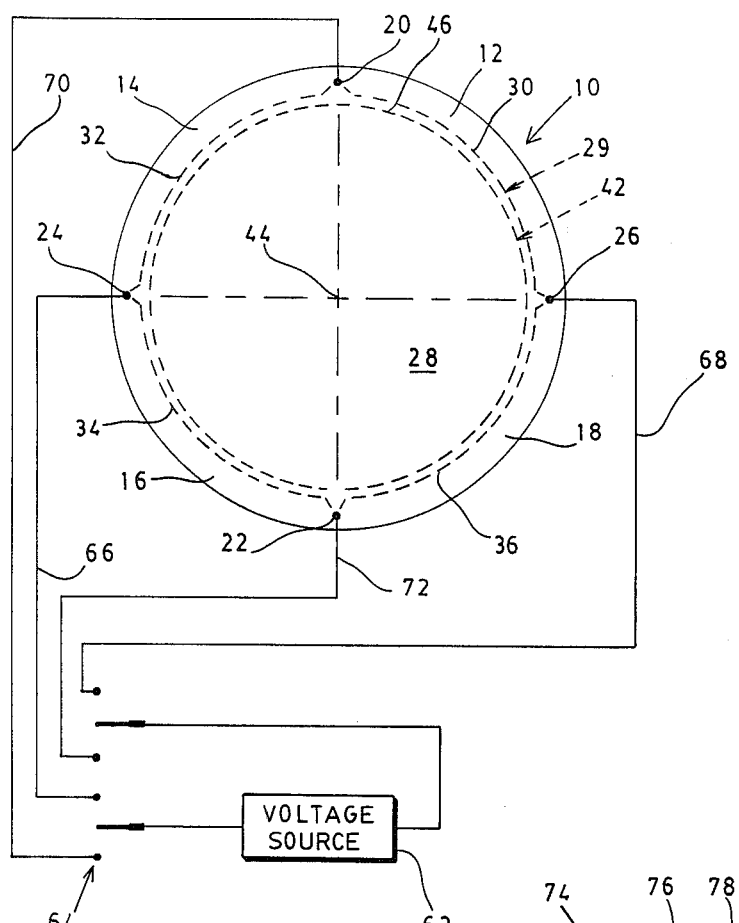
FIG. 4 is a drawing illustrating schematically the manner of introducing potentials into a sensor of the present invention for achieving straight orthogonal equipotential lines and uniform sensitivity throughout the sensor.

The present invention is now described in detail by referring to FIG. 1 taken in combination with FIG. 4. As illustrated, the sensor 10 is divided into four quadrants designated 12, 14, 16, and 18. FIG. 1 is an enlarged view of the quadrant designated 12. In these figures (and in FIGS. 3 and 4) the polar points are designated at 20 and 22, and the equatorial points are designated at 24, 26. These points are referred to hereinafter as "tie points". The sensor 10 has a resistive surface 28 having, for example, an electrical sheet resistivity of about 10 to about 10,000 ohms per square. Preferably, this resistivity should have a uniformity within about 5 percent; however, when less positional accuracy is required, the uniformity can be up to about twenty-five percent. It is typically required that the tie points be insulated from the resistive surface.

The resistive surface 28 can be, for example, a coating applied to a substrate of rigid plastic, glass or various types of "printed" circuit board as by spraying or other means of application of appropriate materials such as a resistive ink, a semiconducting oxide, etc. Persons skilled in the art will know the various methods and materials for producing the necessary resistivity. Some of this technology is described in U.S. Pat. No. 4,220,815, issued Sept. 2, 1980, which patent is incorporated herein by reference. Alternatively, the resistive surface can actually be a volume-conducting sheet such as rubber or plastic. In addition, the substrate can be flexible instead of rigid, and the sensor can either be substantially transparent or opaque depending upon the application thereof.

Spaced along the periphery of the resistive surface in a generally circular path 29 is a resistance element for each quadrant, i.e., resistance elements 30, 32, 34 and 36. These are identical elements and are, in this embodiment, resistance wires. Typically this is 43-gauge Nichrome wire having a resistance of about 130 ohms per foot. In general, the resistance of the resistance element, expressed in ohms per foot, is about 0.6 times the sheet resistivity of the surface, expressed in ohms per square. Thus, for a resistivity range of 10 to 10,000 ohms per square, the resistance elements can have a resistance of about 6 to 6,000 ohms per foot, respectively. The same relationship exists for the embodiments illustrated in FIGS. 2 and 3, also. However, the resistance value of the resistance elements is not particularly critical to the invention.

Potentials for energizing (producing X and Y equipotential lines in) the resistive surface 28 are applied at tie points located at the equatorial points 24, 26, and then alternately at other tie points at the polar points 20, 22. This is in contrast to a rectangular sensor where the potentials are applied at corners. In order to transfer the potentials to the resistive surface, they are first transferred to the resistance elements. Thus, both resistance elements 30 and 32 must be joined to polar tie point 20, with their opposite ends joined to equatorial tie points 26, 24, respectively. Similarly, one end of each of the resistance elements 34, 36 are each joined to polar tie point 22, and their opposite ends are joined to equatorial tie points 24, 26, respectively. The various ends of the resistance elements normally cannot be directly joined, however, because there would be insufficient resistance between electrodes of adjoining quadrants to establish the proper potentials. This can be overcome, if needed, by inserting a resistance 38 (e.g., resistance 38A, 38B, etc.) between an end of resistance element 30 and polar tie point 20, and a similar resistance is placed at all of the junctions between resistance elements and the respective other tie points. Typically, this resistance 38 has a value of about 10 to about 55 ohm when the resistance elements have a resistance of 130 ohms per foot. A value of 33 ohms is satisfactory. The resistance can be produced in any suitable manner, e.g., a selected length of the wire used to produce the resistance elements.

Actual production of equipotential lines in the resistive surface 28 is accomplished by a plurality of electrodes 40 placed along a circular path 42 having the sensor center 44 as the center of the path. Referring specifically to FIG. 1, the electrodes 40 (e.g., 40A, 40B, etc.) have a selected length (effective size) along the path 42 and a selected spacing therebetween, with this length and spacing being substantially symmetrical about a centerline between edges of the quadrant. Thus, electrode 40A is the same length as electrode 40G, electrode 40B is the same length as electrode 40F, etc. Similarly, the spacing between electrodes 40A and 40B is the same as the spacing between electrodes 40F and 40G, etc. The length (typically 0.062 to 0.5 inch) and the spacing is selected to compensate for non-linearities produced by the geometric configuration of the sensor and any cumulative voltage drop that will occur along the resistance element 30 due to current flow into the resistive surface 28 from the electrodes 40. This is, in part, similar to the selection of size and spacing as described in the above-cited U.S. Pat. No. 4,661,655 which is incorporated herein by reference. However, the different arrangement as to the points of current introduction, and the different geometric arrangement of the resistance elements with respect to the equipotential lines affect the selection of size and spacing. Each of the electrodes 40 is joined in a conventional manner to the resistance element 30 with a narrow conductive leg 46A, 46B, etc.

As stated above, each quadrant of the present invention is identical to the other quadrants. Thus, each quadrant has electrodes of the same size and spacing to accomplish the necessary compensation to achieve straight orthogonal equipotential lines.

When potentials are introduced in the manner illustrated in FIG. 4, there can be some distortion (ripple) in the equipotential lines in the proximity of the polar and equatorial points. This is caused by the distance between the end electrode in one quadrant and the end electrode in the adjacent quadrant. A suitable form of correction to straighten the equipotential lines in these regions is the placement of "floating" conductive elements 48 (e.g., 48A, 48B, etc.) between end electrodes of adjacent quadrants. By "floating" is meant that no intentional potential is applied thereto. These conductive elements 48 are placed on the same circular path 42 as are the electrodes 40. The size of these conductive elements will be discussed hereinafter with respect to a specific embodiment of the present invention. When such correction is applied, substantially straight orthogonal equipotential lines (as indicated at 50, 52) are achieved even proximate the polar and equatorial points.

Figure 2:
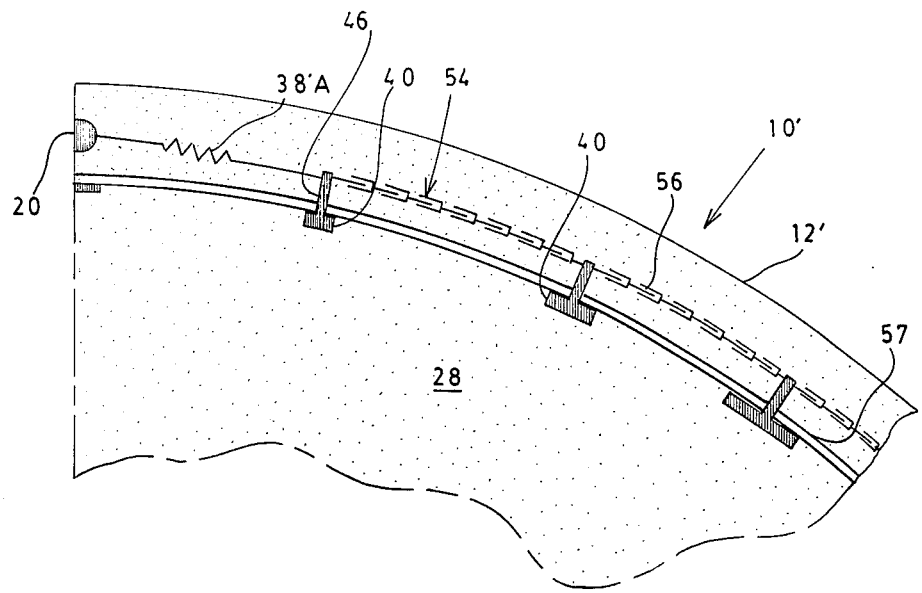
FIG. 2 is a drawing of a partial quadrant of another embodiment of the present invention.

Before describing a specific embodiment of the present invention, two variations of types of resistance elements are depicted in FIGS. 2 and 3. In FIG. 2, for example, the resistance wire 30 is replaced with a discontinuous resistance element 54 in the form of a plurality of Y-shaped conductive elements 56 in electrical contact with the resistive surface. The value of the resistance of such an array is determined by the value of the resistivity of the surface 28 and the spacing between legs of the Y-shaped elements. This is discussed in detail in the previously cited U.S. patent application Ser. No. 870,848 which is incorporated herein by reference. Other than this change, the embodiment of FIG. 2 performs in the same manner as that of FIG. 1. As described in that application, an electrical isolation line 57 which is devoid of the resistive surface may be desired between the resistance element 54 and the electrodes 40. In this embodiment, the resistance element 38'A typically is produced by additional of the Y-shaped elements.

Shown in FIG. 3 is the "E" pattern for forming resistance element 58. Again, the resistance value is determined by the value of the resistivity of the resistive surface 28 and the spacing between legs of the E-shaped elements 60. This is also discussed in the above-cited Ser. No. 870,848. The resistance element 38"A is typically formed using more of the E-shaped units. Although not shown, this embodiment can have an isolation line as indicated in FIG. 2. The embodiment of FIG. 3 also performs in the same manner as that of FIG. 1.

Referring again to FIG. 4, the manner of applying potentials to the sensor 10 is illustrated schematically. The appropriate value of potential is obtained from a voltage source 62. Through the working of a "switch" 64, the potential can first be applied to the polar points 20, 22, via leads 70, 72, with equatorial points 24, 26 electrically disconnected from the voltage source 62. In an appropriate time sequence, the switch 64 is operated to connect the source 62 between equatorial points 24, 26, via leads 66, 68, and disconnect polar points 20, 22 from the source. This switching is substantially continuous throughout the operation of the sensor. This produces electrical fields, and thus the equipotential lines 50, 52, in the resistive surface in the orthogonal X- and Y-directions. Although the switch 64 is illustrated as being mechanical, in practice it is an electronic switch of the type that would be known to persons skilled in the art.

Figure 5:
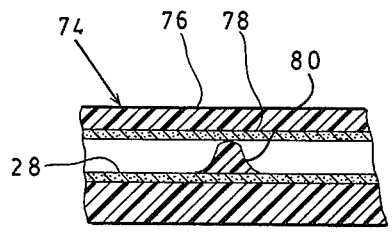
FIG. 5 is an enlarged fragmentary cross-sectional view of the sensor of the present invention illustrating one embodiment for introducing or obtaining positional information using this sensor.

Positional information can be obtained, for example, by providing a contact means to be brought into contact with the resistive surface at a selected location. Shown in FIG. 5 is one embodiment of a contact means. More specifically, the present invention preferably has a conductive "pick-off" sheet 74 spaced a small distance above the resistive surface 28. This typically is a flexible film 76 having a conductive coating 78 on the underside of the film. If the sensor is to be transparent, this pick-off sheet is also transparent. The film can either be a rigid-like plastic, such as polyester or polycarbonate, or it can be elastomeric. Typically the conductive coating has a sheet resistivity less than about 1000 ohms per square. The conductive coating is typically maintained away from the resistive surface (except when intentional contact is desired) with a plurality of small dots or islands 80 of insulative material. Alternatively, fibers, insulating lines, or other separating means can be used. It will be recognized by those versed in the art that this separation also can be achieved solely by an air gap. It will be also recognized by persons skilled in the art that other contact means can be utilized, such as a probe. Also, other probe means (e.g., capacitive probes with appropriate driving circuits) can be placed proximate the resistive surface to obtain this positional information.

A fifteen-inch diameter sensor was built according to the construction illustrated in FIG. 1. The radial distance to the inner edge of each electrode 40 (and conductive element 48) was 7.0 inches, and the radial distance to the outer edge of these elements was 7.062 inches, making each of the electrodes and conductive elements 0.062 inch "deep" in a radial direction.

A resistive coating having a sheet resistivity of 200 ohms per square was applied to a glass substrate using indium-tin oxide, and a uniformity was achieved within about two percent. Silver electrodes 40 were deposited along the path 42 by screen techniques. This technique was also used to produce the conductive elements 48 near the polar and equatorial points. The sizes and positions given in the table below were used in the placement of the electrodes. The numbers in parentheses following the electrode numeral denote, in order, the X-coordinate, the Y-coordinate, and the length in inches. The coordinates are to the center of the electrodes.

Electrode 40A: (1.47, 6.84, 0.125)
40B: (2.88, 6.38, 0.250)
40C: (4.04, 5.71, 0.500)
40D: (4.95, 4.95, 0.500)
40E: (5.71, 4.04, 0.500)
40F: (6.38, 2.88, 0.250)
40G: (6.84, 1.47, 0.125)

The conductive legs 46 joining the electrodes 40 to the resistance element 30 were 0.062 in. square, and the resistance element 30 was 43 gauge Nichrome wire having a resistance of 130 per foot. The resistors 38 at each end of the resistance element were 33 ohms each. The conductive elements 48 were each 0.500 in. long. As stated previously, all quadrants of the sensor were identical and symmetrical about a quadrant centerline and utilized equal-valued and positioned components.

It will be understood by persons versed in the art that a sensor of lesser size will require a fewer number of electrodes in each quadrant, just as a larger diameter sensor will require a larger number of electrodes. Further, although ideally electrodes toward a center of a quadrant progressively increase in length, simplicity of fabrication is achieved if the central few are of the same length as illustrated above. Generally for the larger sensors, electrodes in the central 1/3 of the quadrant can be of the same length. For a fewer number of electrodes, the individual lengths must follow the ideal conditions.

The fifteen-inch sensor described above was tested using a circuit equivalent to that shown in FIG. 4. The equipotential lines were measured on the resistive layer. This sensor was demonstrated to be linear to ± one percent of a major diameter in a two-coordinate system throughout the region into close proximity to the electrodes. Since the performance of resistance elements of the type illustrated in FIGS. 2 and 3 have been demonstrated in rectangular sensors, a circular sensor using such resistance elements will also perform satisfactorily.

Although a planar sensor has been described, the same structure can be used to produce a linear sensor on a convex (or other generally symmetrical non-planar) surface. This would include a surface that is hemispherical.

From the foregoing, it may be seen that a circular position sensitive device has been achieved with simplified fabrication that has increased positional accuracy (linearity) over substantially all of the region bounded by the peripheral electrodes. This permits the fabrication of a smaller device for any given area of uniform sensitivity. Although only limited specific embodiments are described fully herein, it will be recognized by persons versed in the art that the teachings contained herein will permit the fabrication of other devices which will perform as described. Accordingly, this invention is limited only by the claims appended thereto, and their equivalents, when taken in combination with the complete description contained herein.

We claim:

1. A circular position sensitive sensor having resistive electrodes which provides a linear response over substantially the entire sensor by achieving straight orthogonal equipotential lines in an X-Y coordinate system throughout said circular sensor, which comprises:
   a resistive surface of uniform electrical sheet resistivity, said surface defining a circular perimeter;
   conductive tie points positioned proximate said perimeter and located at polar and equatorial points of said sensor, said tie points defining divisions between symmetrical quadrants of said sensor;
   a resistance element positioned in each of said quadrants proximate said perimeter, said resistance element of each quadrant defining opposite end portions, said opposite end portions connected to adjacent of said tie points; and
   a plurality of electrodes positioned on said resistive surface along an arcuate path in each of said quadrants proximate said resistance element, said electrodes being electrically attached to said surface and to said resistance element, said electrodes having a selected center-to-center spacing and effective length along said path;
   wherein said selected spacing and length produce voltage gradients at each of said electrodes to compensate for non-linear potentials along said resistance element produced by an arcuate geometry of said resistance element and by any cumulative voltage drop along said resistance element due to current flow from said electrodes into said resistive surface to thereby achieve said straight X- and Y-coordinate equipotential lines within said sensor.

2. The sensor of claim 1 wherein said opposite ends of said resistance elements are connected to said tie points through a resistor.

3. The sensor of claim 1 wherein said resistive surface is supported upon a substrate.

4. The sensor of claim 2 wherein said resistive surface and said substrate are substantially transparent.

5. The sensor of claim 1 wherein said selected effective length of said electrodes in each of said paths increases symmetrically from each edge of each quadrant toward a centerline of each path, and said selected spacing between adjacent electrodes in each of said paths decreases symmetrically from each edge of said quadrant toward said centerline of said path to thereby progressively decrease voltage gradients produced in said resistive surface at said electrodes toward said centerline of said path.

6. The sensor of claim 1 further comprising a conductive element positioned along said paths of said electrodes proximate each of said polar and equatorial points to further straighten equipotential lines in said resistive surface proximate said polar and equatorial points.

7. The sensor of claim 1 wherein said resistance element is a resistance wire having a selected uniform resistance value.

8. The sensor of claim 1 wherein said resistance element is a series of discrete conductive elements, having a selected separation distance, in electrical contact with said resistive surface, the resistance value in ohms per foot of said resistance element being a function of said sheet resistivity of said resistive surface and said selected separation distance between said conductive elements.

9. The sensor of claim 7 wherein said sheet resistivity of said resistive surface is about 10 to about 10,000 ohms per square and said resistance value of said resistance element is about 6 to about 6,000 ohms per foot.

10. The sensor of claim 7 wherein said sheet resistivity of said resistive surface is about 200 ohms per square within a variation of uniformity of about two percent, and said resistance value of said resistance element is about 130 ohms per foot.

11. A circular position sensitive sensor having resistive electrodes which provides a linear response over substantially the entire sensor by achieving straight orthogonal equipotential lines in an X-Y coordinate system throughout said circular sensor, which comprises:
   a resistive surface having a uniform electrical sheet resistivity of between about 10 and about 10,000 ohms per square, said surface defining a circular perimeter;
   conductive tie points positioned on said sensor proximate said perimeter located at polar and equatorial points of said sensor, said tie points defining divisions between symmetrical quadrants of said sensor;
   a resistance element positioned in each of said quadrants proximate said perimeter, said resistance element having a uniform resistance value between about 6 and about 6,000 ohms per foot, said resistance element of each quadrant defining opposite end portions;
   a resistor having a resistance value of between about 10 and about 55 ohms joining each of said opposite ends of said resistance element of each quadrant to adjacent of said tie points;
   a plurality of electrodes positioned on said resistive surface along an arcuate path in each of said quadrants proximate said resistance element, said electrodes being electrically attached to said surface and to said resistance element, said electrodes having a selected center-to-center spacing along said path which symmetrically decreases from each edge of said quadrant toward a centerline of said path and a selected length along said path which symmetrically increases from each edge of said quadrant toward said centerline; and
   wherein said selected spacing and length produce voltage gradients at each of said electrodes to compensate for non-linear potentials along said resistance element produced by an arcuate geometry of said resistance element and by any cumulative voltage drop along said resistance element due to current flow from said electrodes into said resistive surface to thereby achieve said straight X- and Y-coordinate equipotential lines within said sensor.

12. The sensor of claim 11 wherein said sheet resistivity of said resistive surface is about 200 ohms per square with a variation within two percent, said resistance of said resistance elements is about 130 ohms per foot, and said resistor connecting said opposite ends of said resistance elements to said tie points is about 33 ohms.

13. The sensor of claim 11 wherein said resistive surface is supported upon a substrate.

14. The sensor of claim 13 wherein said resistive surface and said substrate are substantially transparent.

15. The sensor of claim 13 wherein said substrate is planar.

16. The sensor of claim 13 wherein said substrate is non-planar.

17. The sensor of claim 11 further comprising a conductive element positioned along said paths of said electrodes proximate each of said polar and equatorial points to further straighten said equipotential lines in said resistive surface proximate said polar and equatorial points.

18. The sensor of claim 12 wherein said selected length of said electrodes in each of said quadrants increases from about 0.062 inch proximate edges of said quadrants to about 0.500 inch proximate said centerline of said quadrant, and wherein said conductive element proximate each polar and equatorial points is about 0.5 inch long.

19. The sensor of claim 11 further comprising:
a voltage source;
switching means connected between said voltage source and said tie points at said polar and equatorial points of said sensor to alternately produce said equipotential lines in said resistive surface; and
means for positioning proximate said resistive surface at a selected location to obtain signals corresponding to X- and Y-coordinates of said selected location.

20. A circular position sensitive sensor having resistive electrodes which provides a linear response over substantially the entire sensor by achieving straight orthogonal equipotential lines in an X-Y coordinate system throughout said circular sensor, which comprises:
a resistive surface having a uniform electrical sheet resistivity of between about 10 and about 10,000 ohms per square, said surface defining a circular perimeter;
conductive tie points positioned on said sensor proximate said perimeter located at polar and equatorial points of said sensor, said tie points defining divisions between symmetrical quadrants of said sensor;
a resistance element positioned in each of said quadrants proximate said perimeter, said resistance element having a uniform resistance value between about 6 and about 6,000 ohms per foot, said resistance element of each quadrant defining opposite end portions;
a resistor having a resistance value of between about 10 and about 55 ohms joining each of said opposite ends of said resistance element of each quadrant to adjacent of said tie points;
a plurality of electrodes positioned on said resistive surface along an arcuate path in each of said quadrants proximate said resistance element, said electrodes being electrically attached to said surface and to said resistance element, said electrodes having a selected center-to-center spacing along said path which symmetrically decreases from each edge of said quadrant toward a centerline of said path and a selected length along said path which symmetrically increases from each edge of said quadrant toward said centerline, said selected spacing and length produce voltage gradients at each of said electrodes to compensate for any non-linearities in potentials produced by arcuate geometry of said resistance element and by cumulative voltage drop along said resistance element due to current flow from said electrodes into said resistive surface to thereby achieve said straight X- and Y-coordinate equipotential lines throughout said circular sensor;
a voltage source;
switching means connected between said voltage source and said tie points at said equatorial and polar points to alternately produce said equipotential lines in said resistive surface; and
means for positioning proximate said resistive surface at a selected location to obtain signals corresponding to X- and Y-coordinates of said selected location.

* * * * *